United States Patent [19]
Wise et al.

[11] 3,820,024
[45] June 25, 1974

[54] ELECTRONIC VELOCIMETER

[75] Inventors: Robert G. Wise, Loveland; Harold D. Wiebe, Sharonville, both of Ohio

[73] Assignee: Cincinnati Milacron Inc., Cincinnati, Ohio

[22] Filed: Aug. 23, 1972

[21] Appl. No.: 283,151

[52] U.S. Cl. .............................. 324/165, 324/173
[51] Int. Cl. ............................................. G01p 3/52
[58] Field of Search ........................... 324/161–166, 324/173–175; 331/53; 317/5; 328/140

[56] References Cited
UNITED STATES PATENTS
3,706,048  12/1972  Johnston ............................ 324/161

Primary Examiner—Michael J. Lynch

[57] ABSTRACT

An electronic velocimeter being readily adaptable for measuring the magnitude and direction of a velocity of a moving element. A transducer is responsive to the moving element and produces an output signal having frequency proportional to the velocity of the moving element. A circuit is provided for measuring the variations in frequency and producing a DC output signal as a function thereof.

3 Claims, 2 Drawing Figures

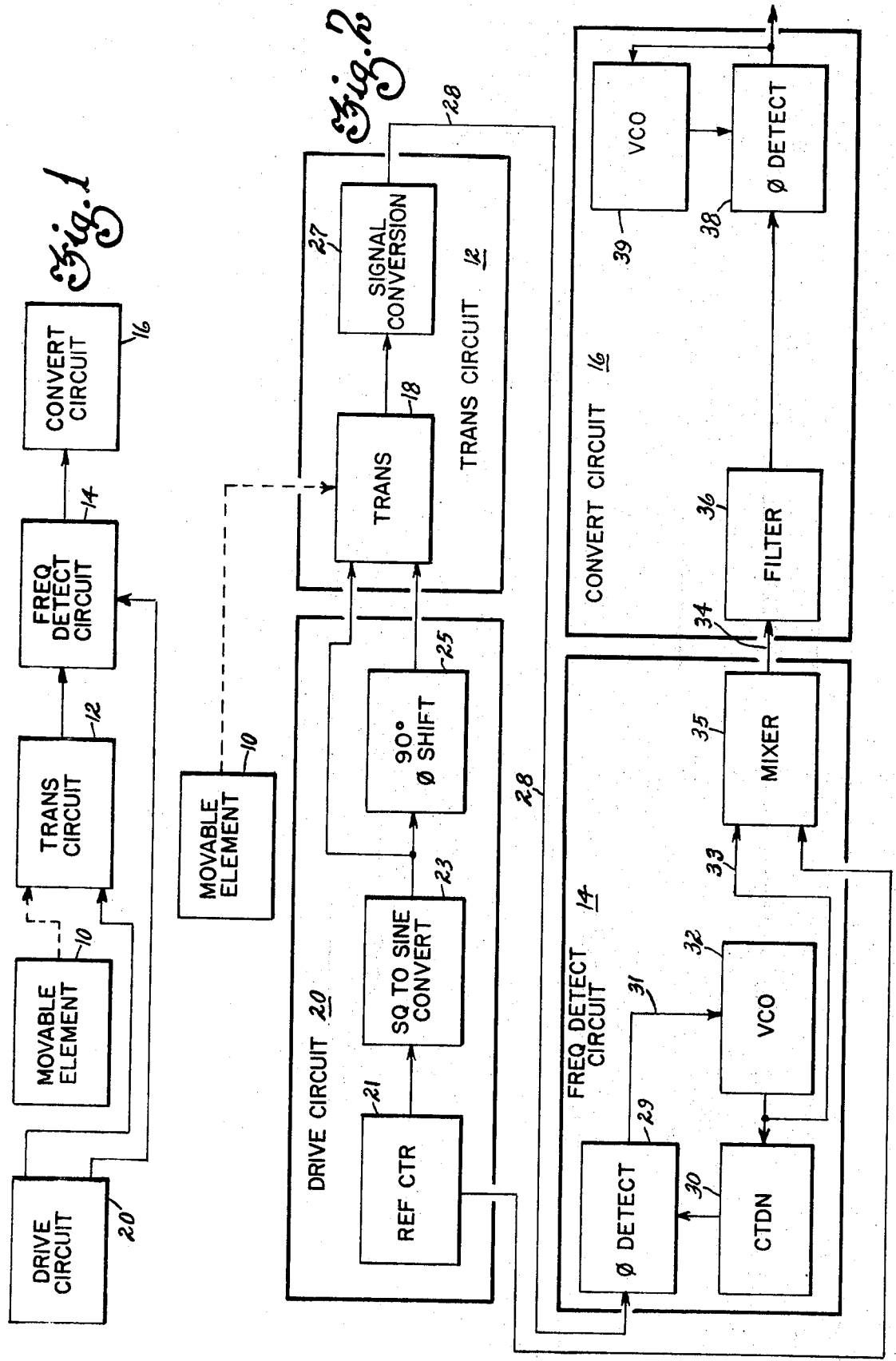

ELECTRONIC VELOCIMETER

BACKGROUND OF THE INVENTION

The invention relates generally to the area of velocity measuring devices; and specifically, the invention discloses an electronic velocimeter for quickly and accurately measuring the speed and direction of a moving element.

Typically, when one desires to measure the velocity of a moving element, a tachometer generator is used in conjunction with the element itself or the driving mechanism therefor. Aside from the relative expense, there are several inherent disadvantages to tachometer generators. First, it is necessary to have a rotary driving force. This must be derived from the moving element itself or its driving mechanism. Consequently, on devices having only linear motors, tachometer generators are highly impractical. They must be coupled into the system by a rack and pinion or some other relatively unreliable and expensive apparatus. In addition, because one must use additional couplings and gearings to apply a tachometer generator, the cost is increased while the reliability is decreased. Several attempts have been made to provide electronic tachometer instruments which are accurate and not dependent on mechanical couplings with the movable element. For example, the co-pending application of G. O. Albrecht and T. E. Nead, Ser. No. 179,901, filed on Sept. 13, 1971, entitled "A Velocimeter" and assigned to the present assignee, provides an apparatus for measuring the velocity of a moving element wherein the transducer is coupled to the moving element and generates a periodic output signal having a frequency that changes as a function of a velocity of the moving element. The frequency detection circuit is responsive to changes in the frequency providing a control signal as a function thereof. Finally, a convertor circuit is responsive to the output signal and produces a DC output signal having a polarity and amplitude representing the direction and magnitude of the velocity of the moving element. This device is an acceptable electronic tachometer for certain instances, but when the accuracy of the frequency detecting device must be responsive to an instantaneous change in frequency less than 1 percent of the carrier frequency the above application becomes unreliable.

Applicant herein discloses an improved electronic velocimeter which is designed to provide an accurate representation of the direction and magnitude of the velocity of the moving element when the output range is confined to a minute percentage of the carrier frequency.

SUMMARY OF THE INVENTION

The electronic velocimeter of the present invention includes a transducer circuit coupled to a moving element and generating a periodic output signal having a frequency that changes as a function of a velocity of the moving element. The frequency detection circuit is responsive to the output signal for detecting changes in the frequency and providing a control signal as a function thereof. Through use of a frequency synthesizing circuit the control signal is exaggerated several magnitudes so that change in frequency of less than 1 percent of the carrier frequency is converted to an output signal having a frequency change several magnitudes greater than the change in the original carrier frequency. Finally, a convertor circuit which is responsive to this magnified frequency control signal produces a DC output signal having a polarity and amplitude representing the direction and magnitude of the velocity of a moving element.

BRIEF DESCRIPTION OF THE DRAWINGS

FIG. 1 is a general block diagram of the invention.

FIG. 2 illustrates a detailed embodiment of the invention.

DESCRIPTION OF THE PREFERRED EMBODIMENT

FIG. 1 is a general block diagram illustrating the environment of the invention. A moving element 10 is mechanically coupled to a transducer circuit 12 comprised of a transducer element and associated electronic circuitry. The relationship of the moving element connecting mechanical apparatus is not important. The transducer circuit 12 generates a periodic signal having a period which changes as a function of a velocity of the moving element 10. The frequency detection circuit 14 is responsive to the signal from the transducer 12 for measuring changes in the signal frequency. The circuit 14 produces an output signal which is a function of the frequency of the output of the transducer circuit 12. A convertor 16 is responsive to the output signal of the frequency detection circuit for producing a DC output signal having a polarity and amplitude proportional to the velocity of the moving element.

FIG. 2 illustrates the preferred embodiment of the invention. The movable element 10 is mechanically coupled to a transducer 18 in the transducer circuit 12. The transducer 18 may be any commercially available transducer having an output coil which is free to move with respect to multiple phase input coils. Typically, the input coils will be displaced 90 mechanical degrees from each other. Consequently, an input will comprise two electric signals. One being 90 electrical degrees out-of-phase with respect to the other. The output coil is typically in mechanical communication with the movable element, and designed to change in phase relationship with respect to the input coils as the position of the movable element 10 changes.

The input signals to the transducer 12 are provided by drive circuit 20 which produces two constant amplitude input signals 90° out of phase. In a manner well-known to those who are skilled in the art, one signal may be produced by a square to sine convertor 23 being driven by a reference counter 21 which includes necessary count down circuitry. The other signal may be produced by a 90 degree phase shift circuit 25 receiving the output of the square to sine convertor 23. Thus, transducer 18 produces a cyclic output signal having a phase relation to the input signals which is a function of the position of the output winding relative to the input winding. Of course, the position of the output coil is a function of the position of the moving element.

The signal conversion circuit 27 can be can be any well-known conversion which transforms the sine wave input signal from the transducer 18 to a signal of like frequency which is in the proper form for input to the phase detection circuit 29 of the frequency detect circuit 14. In the embodiment as described the signal conversion circuit 27 provides a modified square wave signal having a sloped leading and following edge.

A further characteristic of the transducer 18 is that any change in frequency of the output signal is also a function of the velocity of the output coil, i.e. the movable element 10. As the velocity of the output coil increases in one direction the period of the output signal will decrease thereby increasing its frequency with respect to the carrier frequency. Likewise, if the velocity of the output winding increases in the other direction the period of the output signal will increase thereby decreasing its frequency with respect to the carrier frequency. It is this variance in frequency applicant utilizes in his invention.

The frequency detection circuit 14 of the preferred embodiment utilizes a frequency synthesizing technique to generate an output signal on line 34 which has a significantly higher frequency variation than the output signal on line 28 of the transducer circuit 12. This is of particular significance when the total velocity range of the movable element 10 is confined to a small frequency change, for example, where a 1 percent or less of a variance from the carrier frequency represents the full range of velocity in one direction for the movable element 10. The output on line 28 is received by the frequency detection circuit 14. The frequency detection circuit combines a phase detection circuit 29 with a frequency synthesizing network comprised of the voltage control oscillator 32 and count down circut 30 to provide a phase lock loop. The output on line 34 of the frequency detection circuit is in fact a periodic output having a frequency representing the frequency generated by the transducer circuit 12 but synthesized at a higher frequency rate.

The phase detection circuit 29 receives the modified square wave signal on line 28 and produces a DC output signal representing the difference between the frequency on line 28 and that produced by the countdown circuit 30. This output, present on line 31, varies in amplitude and polarity as frequency of the input signal on line 28 increases or decreases. The voltage control oscillator (VCO) generates a reference output which has a frequency several magnitudes greater than the carrier frequency of the input drive signals to the transducer 18. When the DC voltage signal on line 31 is at a predetermined level representing zero velocity, the VCO 32 produces an output reference signal, which indicates the zero velocity. As the voltage signal on line 31 increases positively or negatively from the reference level the frequency of the VCO output also increases or decreases. Thus, the output on carrier 33 indicates the frequency of the periodic signal produced by the transducing circuit 12.

As previously mentioned, the phase of the output signal from the transducer 12 indicates only the position of the movable element 10. It is necessary to utilize the frequency to determine the velocity of the movable element 10 as it changes position. Therefore, the preferred embodiment utilizes a first phase lock loop to generate a VCO output which corresponds to the frequency which in turn corresponds to the velocity of the movable element 10. This is accomplished by utilizing a phase detection circuit 29 of the sampling type and a countdown network 30 to generate the clocking signals for the sample periods. The output of the VCO 32 provides the drive signal for the countdown circuit 30. Thus, the period of the clocking pulses are an iteration of the frequency of the output of the VCO 32.

The countdown circuit 30 provides periodic clocking pulses which correspond to the carrier frequency of the input drive signals to the transducer 18. For example, when the movable element 10 is stationary, the output of the transducer circuit 12 will have the same frequency as the input drive signals. This will generate the reference DC voltage input to VCO 32. The output of the VCO 32 will therefore be at the VCO reference frequency, which is substantially higher than the carrier frequency.

The countdown circuit 30 reduces this higher reference frequency to a signal having the same frequency as the carrier frequency to clock the phase detection circuit 29. Since the movable element 10 is stationary, a predetermined point on the input signal present on line 28 will correspond to the clocking pulse generated by the countdown circuit 30. The phase detection circuit will thus produce the reference level DC output. When the movable element 10 begins to move the output coil of the transducer 18 will turn. This will change the frequency of the signal on line 28. Thus, the leading edge of the input to the frequency detection circuit no longer corresponds to the leading edge of the clocking pulse and the resulting DC signal on line 31 varies from the reference signal having a polarity representing lead or lag and an amplitude representing the amount of said lead or lag.

The output of the VCO 32 is adjusted accordingly, although the difference is increased by several magnitudes due to the higher frequency range. The countdown circuit 30 updates the clocking pulse rate to correspond to the new frequency on line 28 and new output of the VCO 32. This holds the output of the phase detection circuit 29 at the DC signal representing the frequency on line 28. This signal remains constant until the movable element 10 again begins to change position at a different rate indicating a different velocity by generating a frequency varying from that present in the phase detector 29. At this point the outputs of the phase detect circuit, and the VCO 32 and the countdown circuit 30 are updated as above. Then, the signal on carrier 33 from the VCO 32 is a periodic output signal representing the instantaneous velocity of the movable element 10. The mixer 35 combines the output of VCO 32 with a reference signal having a fixed frequency to provide a signal representing the absolute difference between said inputs. Generally, the second input is an output signal frequency near the reference frequency of the VCO. For example, if the reference counter 21 provided a periodic signal at 50,000 cps and the square to sine convertor 23 included a countdown circuit to reduce the frequency to a 1,000 cps, the input to the frequency detection circuit would vary from 990 cycles per second to 1,010 cycles per second if a 1 percent change represented the maximum range in either direction. Assuming the VCO 32 has a reference frequency of 45,000 cps then a 1 percent change in the input signal on line 28 representing a change maximum change in velocity in either the positive or negative direction would generate a range from 44,550 cps to 45,450 cps at the output of the VCO 32.

This signal is input to the mixer 35 along with the 50,000 cps reference signal to generate a difference signal of 5,000 ± 450 cps. Thus, the difference signal generated by the mixer 35 may vary as much as 9 percent for a 1 percent change in frequency of the transducer 18. A variation of this magnitude is easier to detect and control, thus more accurate results may be obtained. The closer frequency synthesized and the reference input to the mixer the more accurate the results will be. It should be understood that the frequency ranges used herein are only for purpose of example.

The difference signal produced by the mixer 35 is then input to the convertor circuit 16 to provide a DC output signal having an amplitude and polarity representing the speed and direction of the movable element 10. The filter 36 provides a clean periodic signal representing the velocity of the moving element 10. This periodic signal is input to a second phase detecting network 38 to generate a DC output signal having an amplitude and polarity representing speed and direction of the element 10. Again, this signal must respond to changes in frequency in order to provide an instantaneous velocity of the moving element 10. One method of achieving this utilizes a second phase lock loop. However, it is not necessary to provide a VCO which has a stepped up frequency to increase the accuracy of the system. Therefore, the VCO 39 has the same carrier frequency as the input to the phase detect circuit 38. For example, if the input to the phase detect circuit 38 was approximately 5,000 cps as in the above example, the reference voltage frequency pulse of the VCO will also be 5,000 cps. As the input of the phase detect circuit 38 varies from the carrier frequency, the phase lock loop will lock the phase detect circuit at the input frequency. Thus, only changes in the frequency will produce a new DC output signal having a polarity and magnitude representing velocity.

It should be understood that the foregoing is merely illustrative and is not intended to limit scope and spirit of the invention as defined in the attached claims.

What is claimed is:

1. An apparatus for measuring the velocity of a movable member, the apparatus comprising:
   a. means connected to the movable member for producing a periodic square wave signal having a frequency representing the velocity of the movable member;
   b. means responsive to the square wave signal for generating an output signal having a frequency being a product of a predetermined number times the frequency of the square wave signal;
   c. means for combining the output signal with a periodic reference signal to produce a periodic difference signal representing the velocity of said movable element; and
   d. means for converting said difference signal into a DC output signal having an amplitude and polarity indicating the speed and direction of said movable element.

2. The apparatus of claim 1, wherein the generating means further comprises:
   a. means for detecting the phase difference between the square wave signal and a clocking signal to produce a control signal as a function thereof;
   b. a frequency synthesizing means responsive to said control signal for producing the output signal; and
   c. means responsive to the frequency synthesizing means for dividing the output signal by the predetermined number to produce the clocking signal.

3. An apparatus for measuring the velocity of a movable member, the apparatus comprising:
   a. means connected to the movable member for producing a periodic square wave signal having a frequency representing the velocity of the movable member;
   b. a first sequential circuit responsive to said square wave signal for producing a periodic difference signal representing the velocity of said movable element, said circuit including,
      1. first sampling means responsive to the square wave signal for detecting the phase difference between the square wave signal and a clocking signal to produce a control signal as a function thereof,
      2. first frequency synthesizing means responsive to said control signal to produce a periodic output signal having a frequency being a fixed multiple of the frequency of the square wave signal,
      3. means responsive to and controlled by the output signal for producing the clocking signal to control the sampling periods of said first sampling means whereby the sampling period is controlled to correspond to the period of the square wave signal,
      4. means for providing a periodic reference signal, and
      5. means for combining the periodic output signal with said periodic reference signal to produce the periodic difference signal representing the changes in the period of the square wave signal; and
   c. a second sequential circuit responsive to said periodic difference signal for producing a DC output signal having an amplitude and polarity representing the speed and direction of said movable element, said second circuit including
      1. second sampling means responsive to the periodic difference signal for producing the DC output signal, and
      2. second frequency synthesizing means for controlling the second sampling means to maintain said DC output signal until a change in the period of said periodic difference signal is detected.

* * * * *